United States Patent [19]

Puhl et al.

[11] 4,398,265

[45] Aug. 9, 1983

[54] KEYBOARD AND DISPLAY INTERFACE ADAPTER ARCHITECTURE

[75] Inventors: Larry C. Puhl, Sleepy Hollow; Lawrence E. Connell, Clarendon Hills, both of Ill.

[73] Assignee: Motorola, Inc., Schaumburg, Ill.

[21] Appl. No.: 187,305

[22] Filed: Sep. 15, 1980

[51] Int. Cl.³ .............................................. G06F 3/00
[52] U.S. Cl. ................................................... 364/900
[58] Field of Search ... 364/200 MS File, 900 MS File; 179/2 EB

[56] References Cited

U.S. PATENT DOCUMENTS

| | | | |
|---|---|---|---|
| 3,458,664 | 7/1979 | Adlhoch et al. | 179/41 |
| 3,571,519 | 3/1971 | Tsimbidis | 179/41 |
| 3,806,663 | 4/1974 | Peek et al. | 179/41 A |
| 3,898,622 | 8/1975 | Maynard et al. | 364/200 |
| 3,906,166 | 9/1975 | Cooper et al. | 179/41 A |
| 3,962,553 | 6/1976 | Linder et al. | 179/41 A |
| 3,979,730 | 9/1976 | Bennett et al. | 340/172.5 |
| 4,003,028 | 1/1977 | Bennett et al. | 340/172.5 |
| 4,004,283 | 1/1977 | Bennett et al. | 340/172.5 |
| 4,010,448 | 3/1977 | Bennett et al. | 340/172.5 |
| 4,020,472 | 4/1977 | Bennett et al. | 364/200 |
| 4,030,079 | 6/1977 | Bennett et al. | 364/200 |
| 4,032,896 | 6/1977 | Bennett et al. | 364/200 |
| 4,037,204 | 7/1977 | Bennett et al. | 364/200 |
| 4,040,035 | 8/1977 | Bennett et al. | 364/200 |
| 4,069,510 | 1/1978 | Carlow et al. | 364/200 |
| 4,086,627 | 4/1978 | Bennett et al. | 364/200 |
| 4,087,855 | 5/1978 | Bennett et al. | 364/200 |
| 4,097,695 | 6/1978 | Grace et al. | 370/92 |
| 4,122,304 | 10/1978 | Mallien | 179/2 EB |
| 4,144,411 | 3/1979 | Frenkiel | 179/2 EB |
| 4,220,820 | 9/1980 | Mallien | 179/2 EB |
| 4,298,978 | 11/1981 | Nakamura | 370/92 |

OTHER PUBLICATIONS

Portable Telephones for Cellular Systems, by Leitich et al., Motorola, Inc., 9/15/80, 80CH1601–Copyright 1980, Vehicular Technology Society IEEE.
Portable Telephones for 850 MHz Cellular Systems, by R. E. Fisher et al., Bell Laboratories, Whippany, N.J., 9/15/80, 80CH1601-4, Copyright 1980, Vehicular Technology Society IEEE.
Overview of an A.M.P.S. Mobile Call Processing System by Robt. M. Fuller et al., U.S. Communications Corp., Kent, Wash., 9/15/80-80CH1601-4, Copyright 1980, Vehicular Tech. Society IEEE.
Mobile Phone, Fit for Pocket May be Near, Wall Street Journal, Sept. 25, 1980.
Motorola, Inc. Instruction Manual—Advanced Mobile Phone System—800 MHz High Capacity Mobile Radiotelephone 68P81039E25-A, published by Motorola Service Publications, Schaumburg, Illinois–1979.
Motorola, "M6800 Microprocessor Application Manual", pp. 3-8 through 3-28, 1975.

*Primary Examiner*—Eddie P. Chan
*Attorney, Agent, or Firm*—Rolland R. Hackbart; James W. Gillman

[57] ABSTRACT

A unique interface adapter is coupled to a microprocessor by a three-wire self-clocking serial data bus for accommodating a twenty-key keyboard and an eight-digit display. The interface adapter includes circuitry for recovering a clock signal and a non-return-to-zero (NRZ) data signal from the data signal transmitted on two forward signal lines of the serial data bus. The NRZ data signal is shifted into a receiving register, where address circuitry decodes the address portion of the data signal to provide a chip select signal and control circuitry decodes the control portion of the data signal to provide a register select signal, read/write signal and bus sense signal. The register select signal determines whether a control register or display register is to be loaded in response to the read/write signal with the data portion of the data signal. The control register signals activate four status indicating LED's, apply power to the display, select between a ten or sixteen digit display, enable an audio tone generator and reset a status bit flip-flop. The display register receives two BCD digits which are stored in a display memory. The keys of the keyboard are scanned at the same time digits read-out from the display memory are being applied to the display. The signals identifying the row and column of activated keys are provided in a return signal line of the serial data bus.

13 Claims, 8 Drawing Figures

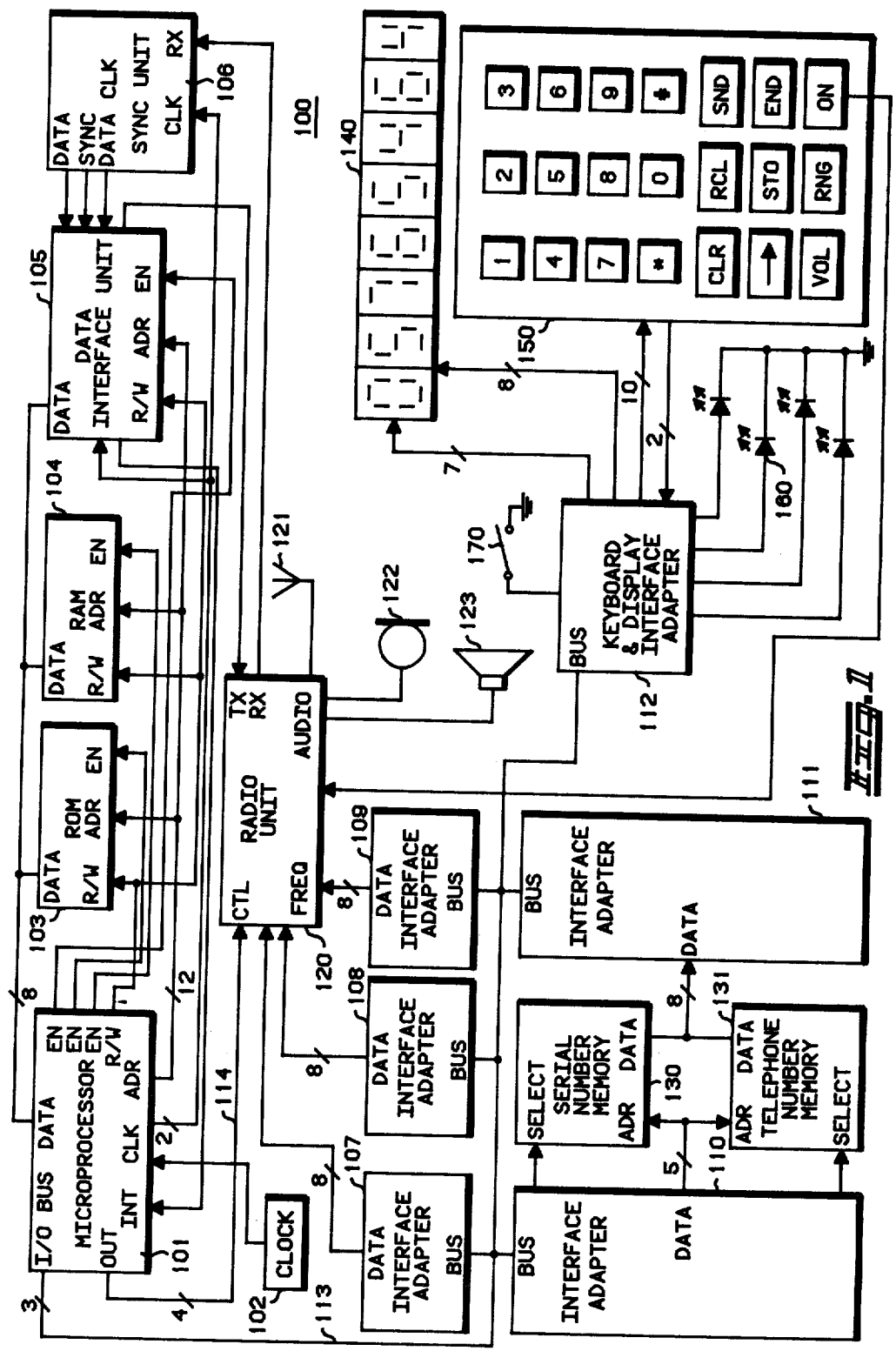

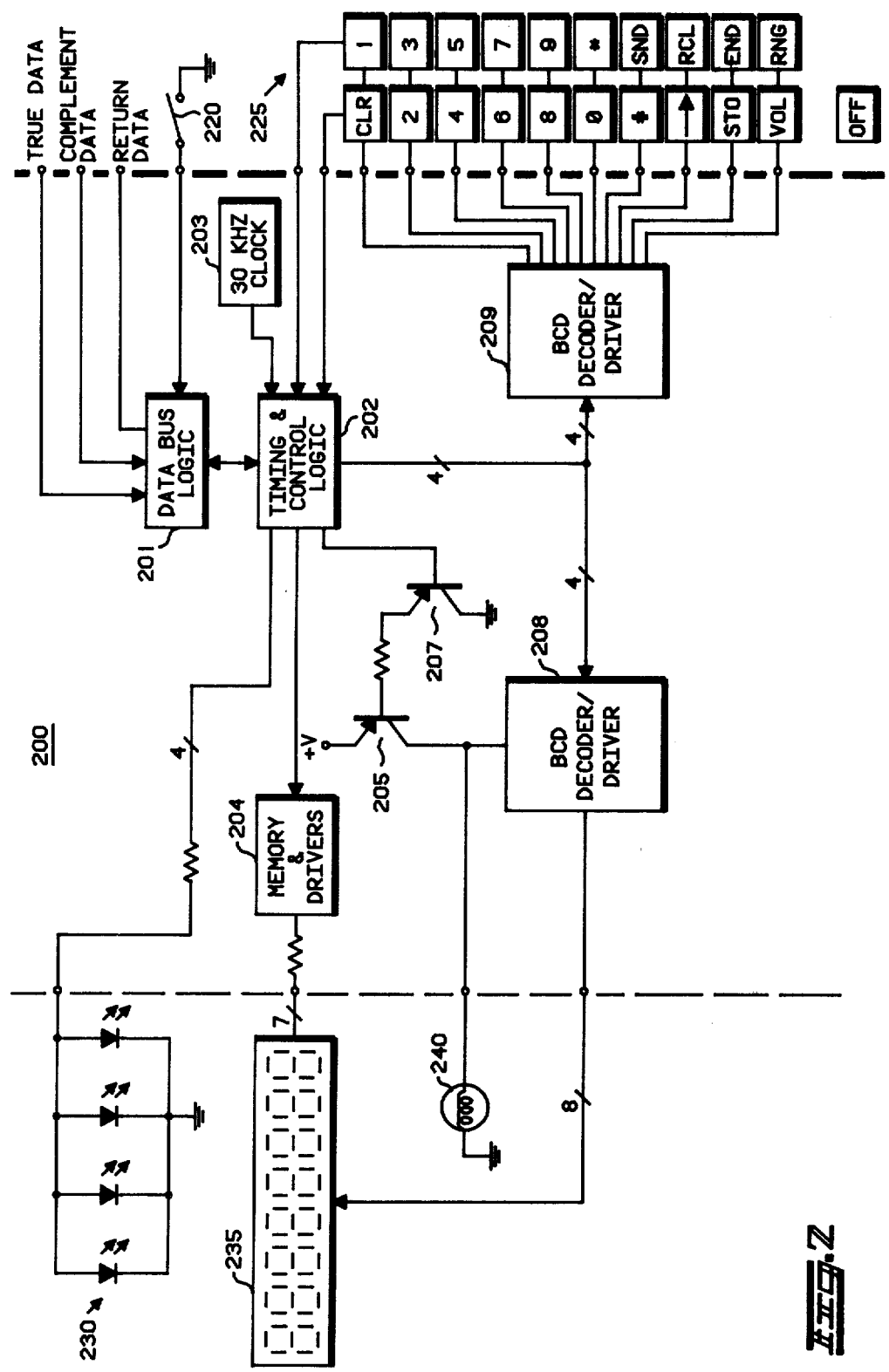

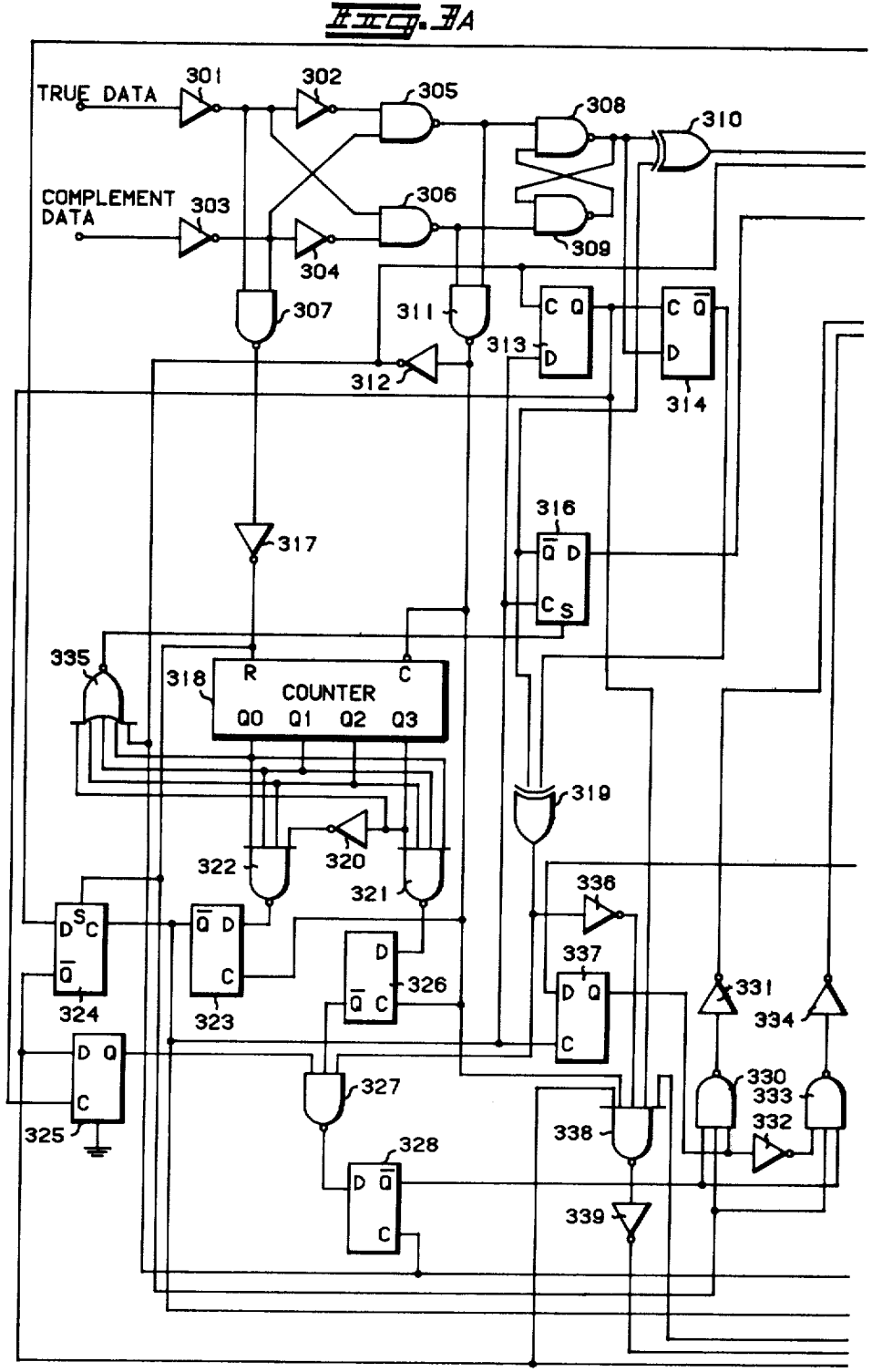

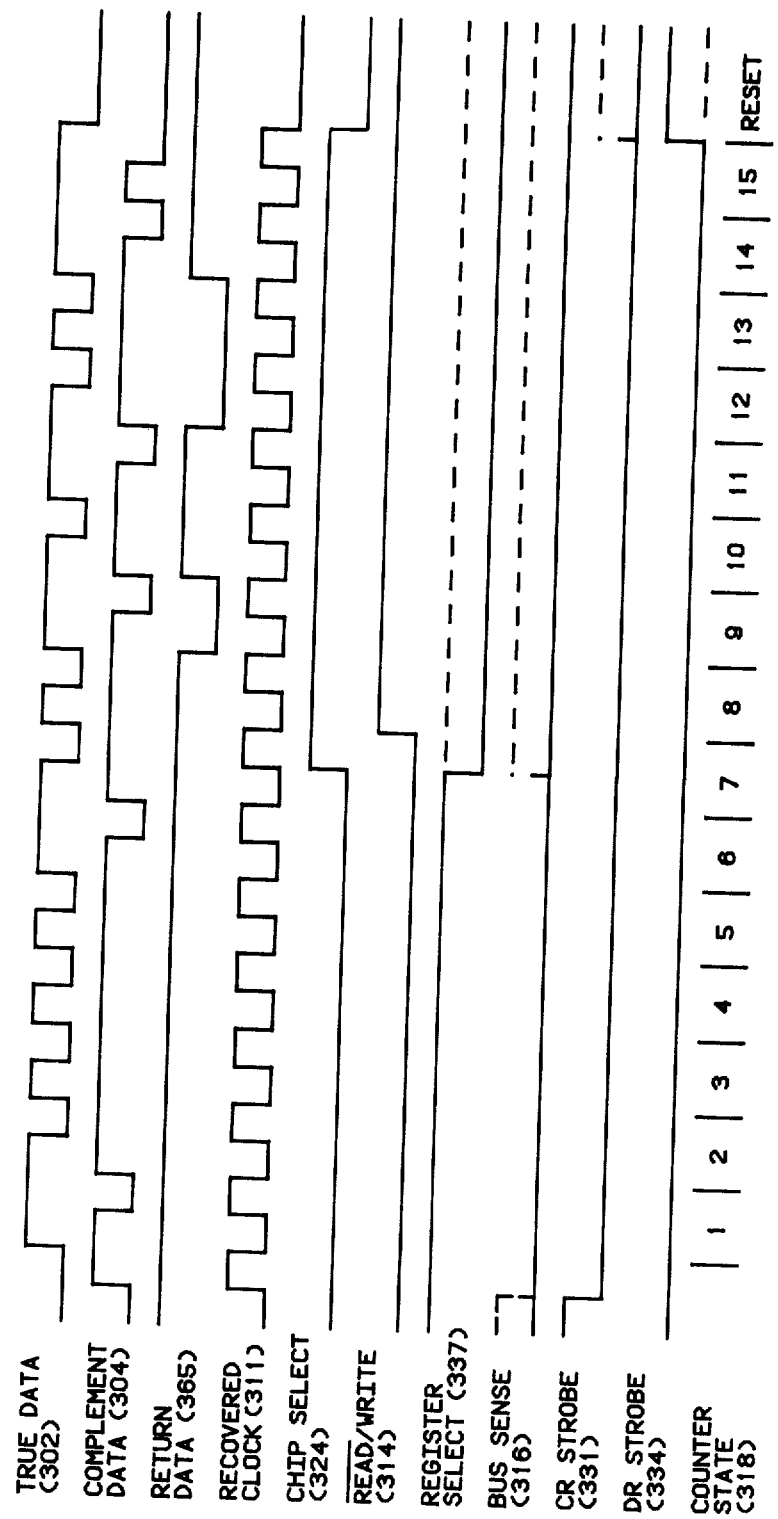

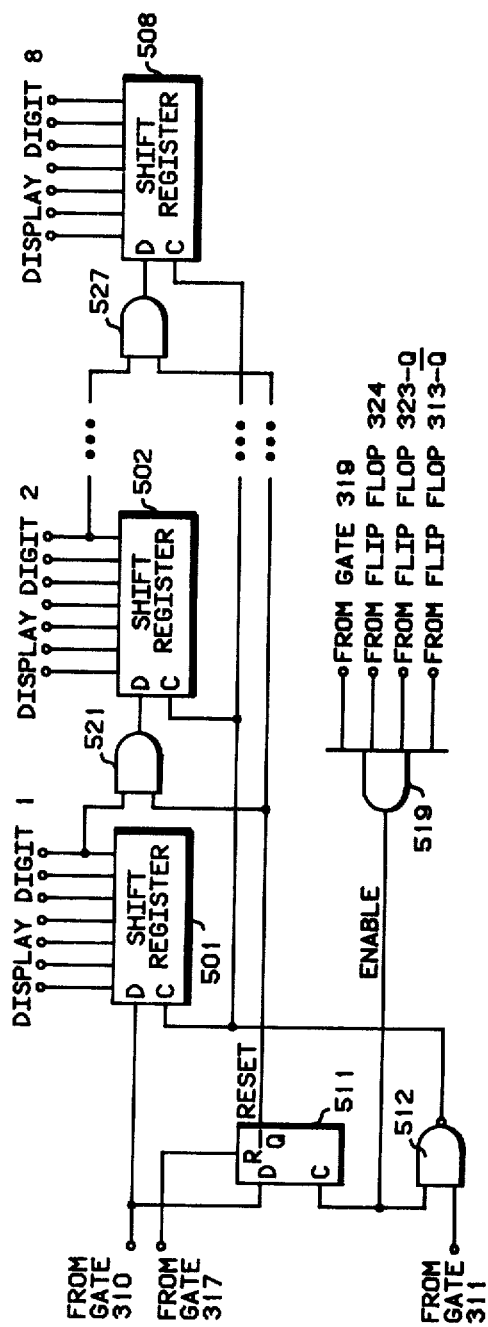

KEYBOARD AND DISPLAY INTERFACE ADAPTER ARCHITECTURE

RELATED PATENT APPLICATIONS

The instant application is related to the following patent applications filed the same date as and assigned to the same assignee as the instant application: Ser. No. 187,306, by Larry C. Puhl et al., entitled "Interface Adapter Architecture"; Ser. No. 187,302, by Larry C. Puhl et al., entitled "Communications Microprocessor Architecture"; Ser. No. 187,304, by Larry C. Puhl et al., entitled "Microprocessor Controlled Radiotelephone Transceiver", and Ser. No. 187,303, now U.S. Pat. No. 4,369,516, by John P. Byrns, entitled "Self-Clocking Data Transmission System and Method Therefor". The instant application is also related to U.S. patent applications, Ser. No. 119,605, now U.S. Pat. No. 4,312,074, by Kenneth A. Felix and James A. Pautler, entitled "Improved Method and Apparatus for Detecting a Data Signal Including Repeated Data Words", and Ser. No. 119,350, now U.S. Pat. No. 4,302,845, by John P. Byrns and Michael J. McClaughry, entitled "Phase-Encoded Data Signal Demodulator", both of which were filed on Feb. 7, 1980, and are assigned to the instant assignee. By reference thereto, the foregoing related patent applications are incorporated in their entirety into the instant application.

BACKGROUND OF THE INVENTION

The present invention is related generally to signal interface circuitry, and more particularly to interface circuitry for coupling interface signals from a keyboard and display to a serial data bus in a microprocessor controlled radio transceiver.

In prior art radio control units, as exemplified by those in U.S. Pat. Nos. 3,458,664 and 3,571,519, interface signals from dialing circuits and visual display indicators have been accommodated by direct connection to dedicated circuitry of the control unit. However, the need for more sophisticated radio control units has resulted in the use of microprocessors for controlling the operation of the radio and even a dedicated microprocessor for accommodating a keyboard and display, as in U.S. Pat. No. 4,122,304. The interface signals formerly connected directly to dedicated circuitry of the radio control unit now must be coupled by appropriate interface circuitry to a microprocessor. Commercially available microprocessors, such as the Motorola type MC6800 microprocessor described in U.S. Pat. No. 4,030,079, have associated interface adapters, such as the Motorola type MC6821 interface adapter described in U.S. Pat. No. 3,979,730, for accommodating a number of interface signals. These interface adapters are interconnected to the microprocessor by connection to its internal parallel address and data buses. Because the connection to the address and data buses is made in parallel, a large number of interconnections are required. In addition, clock and timing signals must also be connected to such interface adapters for proper operation. Separate clock and timing signals render the reception of data signals by these interface adapters highly susceptible to falsing due to speed and timing variations. The number of external interconnections can be reduced somewhat by utilizing microprocessors, such as the Motorola MC6801, which include interface circuitry on the same integrated circuit as the microprocessor. However, such single chip microprocessors are severely limited in the number of direct connections that can be made to interface signals and must use conventional interface adapters to accommodate additional interface signals. Furthermore, if a separate microprocessor is utilized to accommodate the keyboard and display and a separate microprocessor is utilized to accommodate the radio as in U.S. Pat. No. 4,122,304, substantial additional cost is incurred due to the additional microprocessor and programming thereof in order to reduce somewhat the number of interconnections between the two microprocessors. None of these prior art microprocessor systems economically accommodate the large number of interface signals required for interfacing to a keyboard and display while also having relatively few interconnecting signals between the microprocessor and the interface adapters.

SUMMARY OF THE INVENTION

Accordingly, it is an object of the present invention to provide improved interface adapter circuitry that receives data signals from a self-clocking serial data bus for application to display elements of a display.

It is another object of the present invention to provide improved interface adapter circuitry for receiving data signals from a bidirectional self-clocking serial data bus for application to display elements of a display, while at the same time scanning keys of a keyboard for activated keys and applying signals identifying activated keys to a return data signal line of the serial data bus.

It is yet another object of the present invention to provide improved keyboard and display interface adapter circuitry that can be readily incorporated into conventional semiconductive substrates and provided in a single integrated circuit device.

In practicing the present invention, an interface adapter receives a binary data signal including data, address and control portions from a self-clocking serial data bus for application to display elements of a display. The serial data bus includes two forward data signal lines each having first and second binary states, where the first and second forward data signal lines have a first binary state before and after the data signal, the first forward data signal line has a second binary state and the second forward data signal line has the first binary state for data signal bits having a binary one state, the first forward data signal line has the first binary state and the second forward data signal line has the second binary state for data signal bits having a binary zero state, and the first and second forward data signal lines have the second binary state between successive data signal bits. The interface adapter includes circuitry responsive to the first and second, and second and first binary states of the forward data signal lines, respectively, for providing a clock signal, and latch circuitry response to the first and second, and second and first binary states of the forward data signal lines, respectively, for providing a non-return-to-zero output signal. The latch circuitry output signal is serially shifted into a receiving register in response to the clock signal. Address detecting circuitry is responsive to the address portion of the data signal in the receiving register for detecting a predetermined address signal and providing a chip select signal when the predetermined address signal is detected. Control circuitry is responsive to the control signal portion of the data signal in the receiving register for providing first and second control signals. A control register is loaded with the data portion of the data signal in response to the first control signal and the chip select signal, and a display register is loaded with the data portion of the data signal in response to the second control signal and the chip select signal. Other circuitry applies the display register signals to the elements of a display.

The serial data bus may also include a return data signal line on which the interface adapter may transmit data signals identifying activated keys of a keyboard. A transmitting register may be loaded with signals identifying the row and column of an activated key, and, in response to the chip select signal and clock signal, successively shifted for applying the sampled interface signals to the return data signal line.

BRIEF DESCRIPTION OF THE DRAWINGS

FIG. 1 is a block diagram of a radiotelephone that may advantageously utilize a keyboard and display interface adapter embodying the present invention.

FIG. 2 is a functional block diagram of a keyboard and display interface adapter embodying the present invention.

FIG. 4 is a timing diagram showing the signal waveforms for selected circuit elements of the keyboard and display interface adapter in FIG. 3.

FIG. 5 is a block diagram illustrating different circuitry for storing digits to be applied to elements of a display.

DETAILED DESCRIPTION OF THE PREFERRED EMBODIMENT

Figure 3B:
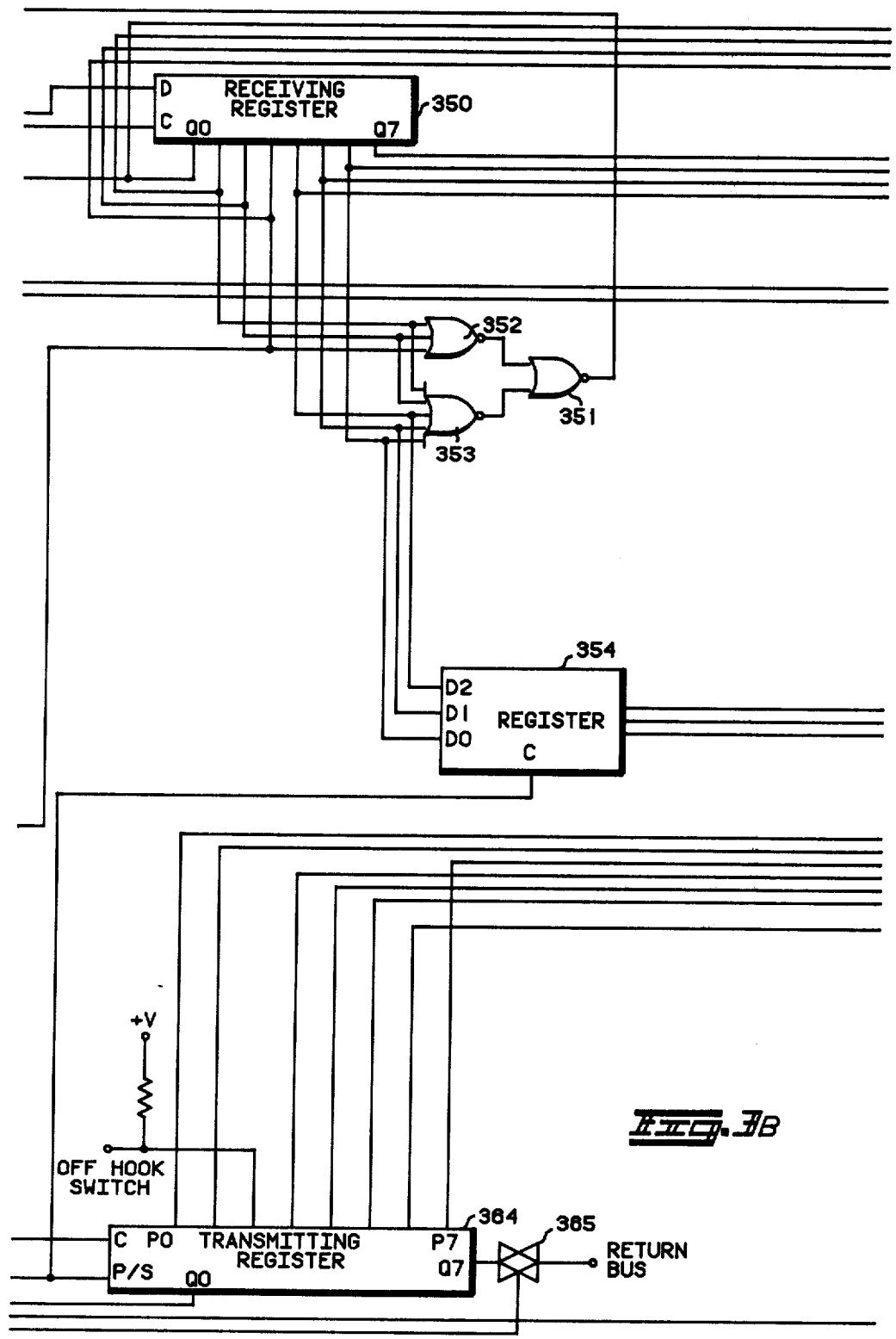
FIG. 3, including FIGS. 3A, 3B, 3C and 3D arranged together, is a detailed circuit diagram of the keyboard and display interface adapter in FIG. 2.
Figure 7C:
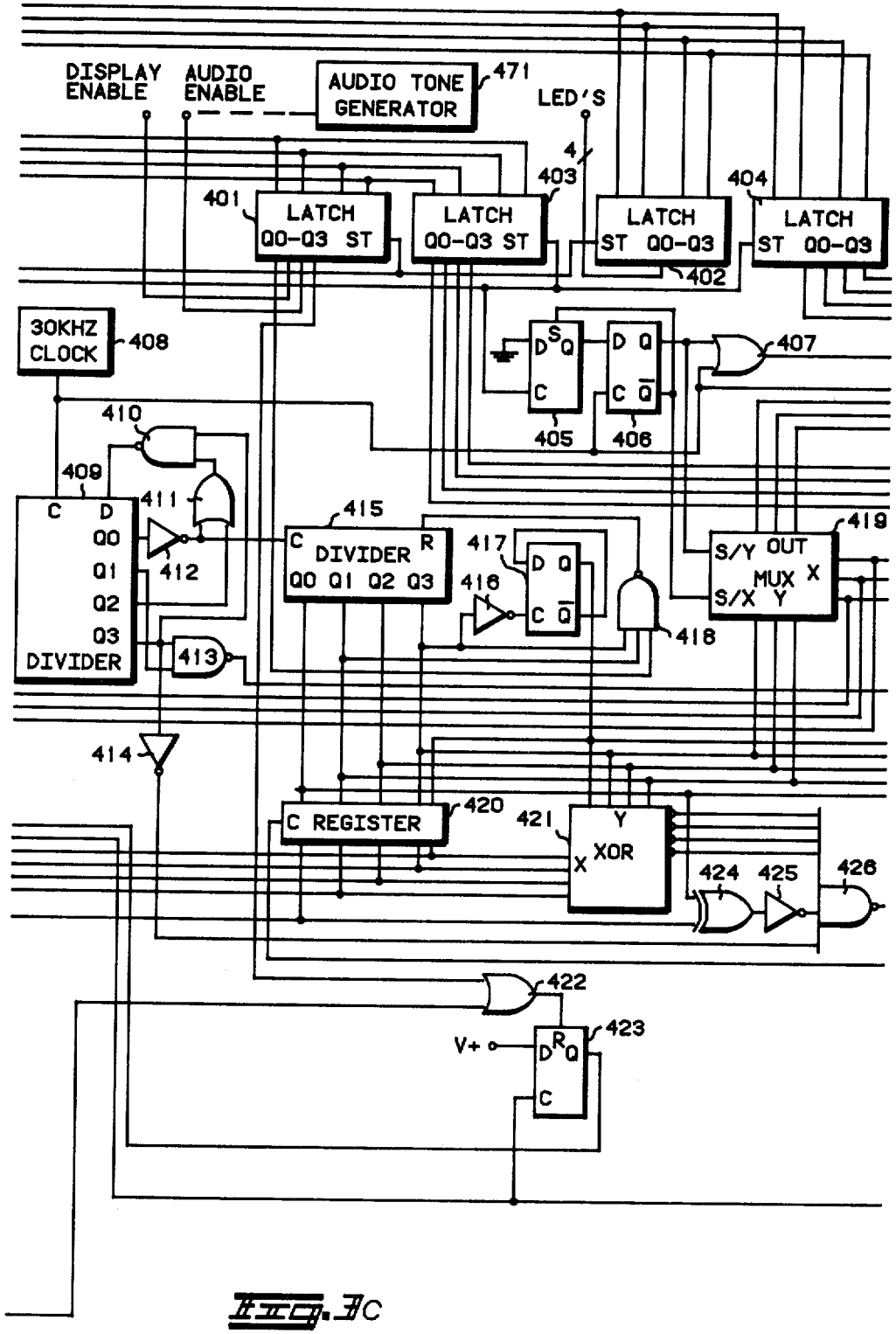

Referring to FIG. 1, there is illustrated a block diagram of a radiotelephone 100 suitable for use in cellular radiotelephone systems of the type described in U.S. Pat. No. 3,906,166 and in a developmental cellular system application, filed by Motorola and American Radio-Telephone Service, Inc. under Docket No. 18262 with the Federal Communications Commission in February, 1977. The radiotelephone 100 provides the same type of fully automatic telephone service to a mobile or portable operator that is provided to land line subscribers. Radiotelephone service is provided over a wide geographical area by dividing the area into a number of cells. Each cell typically has a base station which provides a supervisory signalling radio channel and a number of voice radio channels. Telephone calls are placed to, and originated by, radiotelephones over the supervisory signalling channel in each of the cells. Upon completion of the supervisory signalling, the radiotelephone is assigned a voice channel and switches from the signalling channel to the voice channel for the duration of the call. In the event that a radiotelephone leaves a cell and enters another cell, the radiotelephone is automatically switched over, or handed off, to an available voice channel in the new cell. The supervisory signals carried on the signalling channel, and on voice channels for handing off a radiotelephone as it changes cells, is provided by digital signals encoded in a suitable format, such as Manchester Coding, and transmitted at a relatively high speed, such as 10 kHz. The format and transmission of the digital signals is described in more detail in the aforementioned co-pending applications Ser. Nos. 119,605 and 119,350.

In order to accommodate the high speed supervisory signalling in such cellular radiotelephone systems, the radiotelephone 100 includes a microprocessor 101 together with peripheral devices 103-112, a synthesized radio unit 120, serial number and telephone number memories 130 and 131, a telephone number display 140, a keyboard 150 and status indicating LED's 160. Microprocessor 101 (described in further detail in co-pending application Ser. No. 187,302) is responsive to a control program stored in read-only memory (ROM) 103 for receiving data signals from the radio unit 120 by way of synchronization unit 106 (described in further detail in co-pending application Ser. No. 119,350) and data interface unit 105 (described in further detail in co-pending application Ser. No. 187,302) for storage in random access memory (RAM) 104, and transmitting to radio unit 120 supervisory data signals stored in RAM 104 by way of data interface unit 105.

Microprocessor 101 is also coupled to radio unit 120 directly by four control signals 114, one for powering up the radio unit, two for controlling the frequency synthesizer and one for sensing audio signals applied to microphone 122, and also by way of a unique self-clocking serial data bus 113 and interface adapters 107-109 (described in further detail in co-pending application Ser. No. 187,306). Microprocessor 101 is coupled to interface adapters 107-109 by self-clocking serial data bus 113, which includes two forward data signal lines and a reverse data signal line (described in further detail in co-pending application Ser. No. 187,303). Data signals applied to the forward data signal lines are received by interface adapters 107-109 and applied to radio unit 120. Interface adapter 107 provides audio control signals to the receiver of radio unit 120 for selecting one of two received audio signals if the radio unit includes two antennas 121 for space diversity purposes, controlling the volume of the received audio signal applied to speaker 123, and muting the received audio signal to provide a conventional squelch type function. Interface adapter 108 provides audio control signals to the transmitter of radio unit 120 for controlling the volume of the transmitted audio signal, muting of the transmitted audio signal and powering up the transmitting circuitry. Interface adapter 109 applied an eight-bit frequency control signal to a frequency synthesizer (not shown) in radio unit 120 for determining the transmitting and receiving frequencies thereof. The frequency control signal applied to the frequency synthesizer in radio unit 120 can be expanded to up to sixteen bits by utilizing two direct control signals 114 from the microprocessor 101 to selectively apply either eight high order bits or eight low order bits to the frequency synthesizer. Radio unit 120 can be any conventional radio unit suitable for cellular system operation, such as the radio described in Motorola Instruction Manual 68P81039E25, published by Motorola Service Publications, Schaumburg, Ill., 1979. The radiotelephone described in the aforementioned instruction manual is a frequency synthesized radio specially adapted for use in cellular radio telephone systems.

Microprocessor 101 is also coupled by way of the serial data bus 113 to interface adapters 110 and 111 for accessing a serial number and telephone number assigned to the radiotelephone 100. The serial number and telephone number of the radiotelephone 100 are stored in separate memories 130 and 131, respectively so that each may be changed simply by replacing one memory with another. The serial number and telephone number may include a plurality of binary-coded-decimal digits stored in successive locations of these memories. In order to access each digit of the serial number or telephone number, the microprocessor 101 transmits an address data signal by way of the serial data bus 113 to interface adapter 110. The applied address signal received by interface adapter 110 is applied to the serial number memory 130 and telephone number memory 131. The applied address signal includes one bit for selecting between the serial number memory 130 and telephone number memory 131 and five bits for selecting the particular digit of the serial number or telephone number to be read out. The digit of the serial number or telephone number read out from the addressed serial number memory 130 or telephone number memory 131 is applied to interface adapter 111 which couples the read-out digit to the serial data bus 113 for transmission back to the microprocessor 101.

Microprocessor 101 is also coupled by way of the serial data bus 113 to a unique keyboard and display interface adapter 112 embodying the present invention. The keyboard and display interface adapter 112 provides for the display of eight digits of an entered telephone number in display 140, scans the keyboard 150 for activated keys and activates status indicating LED's 160, one indicating that the radiotelephone is in the roam mode, another that the radiotelephone is in use, another that no service is available to the radiotelephone and the last that the radiotelephone is locked preventing unauthorized use. The keyboard and display interface adapter 112 scans the keys of the keyboard 150, monitors off-hook switch 170, and applies a data signal to the serial data bus 113 indicating which keys are found to be activated and whether the off-hook switch 170 is activated or not. The keyboard and display interface adapter 112 also receives data signals transmitted by the microprocessor 101 on the serial data bus 113 for display in the telephone number display 140 or for activating one of the four status LED's 160.

The radio unit 120 of the radiotelephone 100 may be either a mobile unit as described in the aforementioned Motorola Instruction Manual 68P81039E25 or a hand-held portable unit of the type described in U.S. Pat. Nos. 3,906,166 and 3,962,553 having an external appearance as illustrated in U.S. Pat. No. Des. 234,605. The microprocessor 101 and associated peripheral devices 103-112 are of the type that may readily be integrated into a semiconductive substrate, such as CMOS, and provided individually or together on an integrated circuit. The microprocessor 101 and related peripheral devices 103-112 have been architectured such that the high priority supervisory signals received and transmitted by radio unit 120 are handled on a high speed interrupt basis by data interface unit 105 and synchronization unit 106, while the lower priority control signals for the radio unit 120, display unit 140, keyboard 150 and status LED's 160 are handled on a lower speed basis by way of the serial data bus 113 and interface adapters 107-112. Since the serial data bus 113 is self-clocking and independent of the speed of transmission, interface adapters 107-112 can be physically located remote from microprocessor 101 without any degradation in performance. Thus, interface adapters 107-109 may be located in the radio unit, if desired, and the keyboard and display interface adapter 112 may be located on the same printed circuit board as the telephone number display 140 and keyboard 150, both being physically separated from the printed circuit board on which microprocessor 101 is located. Further details as to the exact description and construction of the transmitting and receiving circuitry in a typical radio unit 120 can be found in the aforementioned Motorola Instruction Manual 68P81039E25.

Referring to FIG. 2, there is illustrated a display and keyboard interface adapter 200 embodying the present invention. The keyboard and display interface adapter 200 can store and refresh up to sixteen digits for display in a suitable display 235, such as an LED type or liquid crystal type display. If ten or less digits of the display are utilized, one can programmably shorten the display refresh cycle, thereby increasing the intensity of the displayed digits. The keyboard and display interface adapter 200 can also scan and debounce up to thirty-two keys of a pushbutton keyboard 225. When an activated key is detected, one can programmably enable an audio tone generator (not shown) to provide audible feedback. If the display refresh cycle is shortened for a ten digit display 235, the keyboard and interface adapter 200 will then scan and debounce twenty keys of a pushbutton keyboard 225.

The keyboard and display interface adapter 200 is coupled to microprocessor 101 in FIG. 1 by way of self-clocking serial data bus 113. Sixteen-bit data signals including address, control and data portions, are transmitted on the serial data bus 113 by microprocessor 101 in FIG. 1 to the keyboard and display interface adapter 200 in a self-clocking format on two forward data signal lines, which are designated the true data and complement data signal lines. The data transmission format, described in further detail in co-pending application Ser. No. 187,303, makes use of the four possible two-bit binary states of the true data and complement data signal lines in order to encode the binary state of each bit, a clock signal and framing information. The two-bit binary states assigned to the true data and complement data signal lines for each of the four possible states is illustrated hereinbelow in Table I. It is to be understood that these binary states can be reassigned many different ways in accordance with the teachings of co-pending application Ser. No. 187,303.

TABLE I

| TRUE DATA | COMPLEMENT DATA | TWO-BIT STATE |
|---|---|---|
| 0 | 0 | Word State |
| 0 | 1 | Zero State |
| 1 | 0 | One State |
| 1 | 1 | Bit State |

Referring to Table I, the word state is provided before and after the sixteen-bit data signal, the zero state is provided for each binary zero bit of the data signal, the one state is provided for each binary one bit of the data signal and the bit state is provided between successive data signal bits. Successive sixteen-bit data signals may be transmitted one after another as long as the word state of the true data and complement data signal lines is provided between them. A typical sixteen-bit data signal coded according to this format is illustrated by the waveforms in FIG. 4.

Referring specifically to FIG. 2, sixteen-bit data signals are received on the serial data bus by data bus logic 201 and timing and control logic 202. As illustrated in Table II hereinbelow, each sixteen-bit data signal includes address and control bits 1-8 and data bits 9-16 (where bit one is received first). In order to properly select the keyboard and display interface adapter, bits 1-6 of a data signal are XXX000 or 000100 depending on whether the status of the display 235 or LED's 230 is to be updated. The data portion, bits 9-16, of received data signals are used to control LED's 230, transistors 205 and 207 for powering BCD decoder/driver 208 and lamp 240, and to update the digits stored in memory 204, for application to display 235.

TABLE II

| SIXTEEN-BIT DATA SIGNAL | | |
|---|---|---|
| DATA BIT | FUNCTION | DESCRIPTION |
| 1-3 | Address | RAM address or all zero |
| 4 | Register Select | 1 selects CR<br>0 selects DR |
| 5-6 | Chip Select | Both zero |
| 7 | Bus Sense | 1 for true<br>0 for complement |
| 8 | Read/Write | 1 for read<br>0 for write |
| 9-12 | Data | DR; Low BCD display digit<br>CR; Ten digit mode, Display enable, Reset status bits, Audio Enable |
| 13-16 | Data | DR; High BCD display digit<br>CR; LED's ON/OFF |

The timing and control logic 202 enables BCD decoder/driver 208 and memory and drivers 204 so that display 235 is continuously strobed with the digits stored in memory 204. At the same time, the timing and control logic enables BCD decoder/driver 209 to sequentially strobe each row of keys in keyboard 225. The +V power supply to BCD decoder/driver 208 and lamp 240 can be programmably disabled by turning off transistors 207 and 205. If a particular key of keyboard 225 is activated, a signal is returned by way of the column conductors to timing and control logic 202. Since the keyboard and display interface adapter 200 is coupled to the microprocessor 101 in FIG. 1 only by way of a serial data bus, the keyboard and display interface adapter 200 may be located with the display 235 and keyboard 225 at a considerable distance from microprocessor 101.

Referring to FIGS. 3A, 3B, 3C and 3D, there is illustrated a detailed circuit diagram of the keyboard and display interface adapter in FIG. 2. The true data and complement data signal lines from the serial data bus are coupled via inverting gates 301, 302 and 303, 304 to NAND gate 305 for decoding the one state, NAND gate 306 for decoding the zero state and NAND gate 307 for decoding the word state. The decoded word state from NAND gate 307 is coupled via inverting gate 317 to reset counter 318 and to enable NAND gates 330 and 333 when data signals are not being received.

The decoded one state of the true data and complement data signal lines is coupled from NAND gate 305 to NRZ data latch 308, 309 and sets the NRZ data latch 308, 309 to provide a binary one state at the output of NAND gate 308 for recovered bits of the data signal having a binary one state. The decoded zero state from NAND gate 306 is coupled to data latch 308, 309 for resetting the NRZ data latch 308, 309 to provide a binary zero state at the output of NAND gate 308 for binary zero bits of the recovered data signal. The output of data latch 308, 309 is coupled by exclusive OR gate 310 to the D input of receiving register 350. Exclusive OR gate 310 complements the NRZ data signal from data latch 308, 309 in response to the bus sense signal from flip-flop 316, which has a binary one state when the true data and complement data lines have been interchanged. Interchanging the connections of the true data and complement data signal lines allows a second keyboard and display interface adapter to be uniquely addressed. For addressing the second keyboard and display interface adapter, bits 1-6 of each data signal (see Table II) are complemented so that the chip select signal is properly decoded by gates 351-352.

The decoded one state and zero states from NAND gates 305 and 306 are combined by NAND gate 311 to provide a recovered clock signal which is coupled to the clock inputs of counter 318 and flip-flops 323 and 326. The clock signal from NAND gate 311 is inverted and applied via inverting gate 312 to NOR gate 335, receiving register 350, transmitting register 364 and flip-flop 328. In other embodiments, a clock signal may be provided by decoding the bit state transmitted between successive bits of the data signal.

For each zero and one state of the true data and complement data signal lines counter 318 is advanced from one state to the next, as illustrated by the waveforms in FIG. 4. When counter 318 reaches state seven, which is decoded by NAND gate 322, seven bits of the address and control portion of the data signal have been loaded into receiving register 350 and the eighth bit is in data latch 308, 309. In the middle of the seventh state of counter 318, flip-flop 323 provides an output pulse which clocks the chip select flip-flop 324, the BCD digit address register 354, the register select flip-flop 337 and the bus sense flip-flop 316, which all are loaded in accordance with the received bits of the data signal in the receiving register 350. The address bits in the receiving register 350 are decoded by gating circuitry 351-353, and if the address of the interface adapter is detected, NOR gate 351 provides a binary zero state which is loaded into chip select flip-flop 324 providing a binary one state at its output. The binary one state from chip select flip-flop 324 enables transmission gate 365 for applying the signals stored in the transmitting register 364 to the return data signal line.

Next, flip-flop 313 is loaded with the pulse from flip-flop 323 in response to the clock signal from inverting gate 312 and is utilized to clock the read/write flip-flop 314 and flip-flop 325 and enable NAND gate 338. The binary state of the read/write signal, which is in data latch 308, 309 during state seven of counter 318, is loaded into flip-flop 314 and complemented such that if the control register 401, 402 or the display register 403, 404 is to be loaded, flip-flop 314 provides a binary one state at its output. Flip-flop 325 is loaded with the chip select signal from flip-flop 324 and applied via NAND gate 327 to write enable flip-flop 328. NAND gate 338 via inverting gate 339 resets flip-flop 423, the status bit, if it was previously set and the transmitting register 364 is to be read.

The output pulse from flip-flop 323 also causes the transmitting register 364 to be parallel loaded with the signals in Table III hereinbelow during state seven of counter 318. Then, if the interface adapter has been properly addressed, the sampled signals are shifted out of the transmitting register 364 and applied to the return data signal line via transmission gate 365.

Once the interface adapter has been properly addressed and the binary states of the control signals in the received data signals have been stored in corresponding flip-flops, the following eight bit data portion of the received data signal is loaded into the receiving register 350 and applied as dictated by the stored control signals. If the bus sense control signal was a binary zero, indicating that the true data and complement data lines have been interchanged, the bus sense flip-flop provides a binary one output signal which is coupled to exclusive OR gate 310 for complementing the bits of the data portion of the data signal and to exclusive OR gate 319 for complementing the output signal from the read/write flip-flop 314. These signals must be complemented since the bits of the data signal are complemented when the true data and complement data signal lines are interchanged, as described hereinabove.

Next, state fifteen of counter 318 is decoded by NAND gate 321 and coupled to flip-flop 326 which provides a binary one output signal at the next positive transition of the clock signal 311. The binary one output from flip-flop 326 together with the chip select signal from flip-flop 325 and the read/write signal from exclusive OR gate 319 are applied to NAND gate 327 causing write enable flip-flop 328 to provide a binary one output to load either the control register 401, 402 or display register 403, 404 with the data signal in receiving register 350. NAND gates 330 and 333 combine the write enable signal from flip-flop 328, the register select signal from flip-flop 337 and the detected word state 307, 317 of the true data and complement data signal lines from inverting gate 317 to provide corresponding strobe signals to the control register 401, 402 and display register 403, 404, respectively. The strobe signals 331 and 334 are held in the binary zero state while the data signal is being clocked into receiving register 350 by the detected word state 307, 317. When the strobe signals 331 and 334 to control register 401, 402 and display register 403, 404 have a binary zero state, each of the registers 401, 402 and 403, 404 is in the latched state. The strobe signals 331 and 334 change to a binary one state depending on which register 401, 402 or 403, 404 has been selected and is to be written into. A binary one state of the strobe signals 331 and 334 to the control register 401, 402 or display register 403, 404 causes it to be transparent transferring the data portion of the received data signal from receiving register 350 to the output of the strobed register. The control register 401, 402 is loaded (See Table II) with control signals for activating LED's 230 in FIG. 2, selecting a ten-digit mode, enabling the power to the display via transistor 207 and 205 in FIG. 2, resetting the status bit 423 and enabling an audio tone generator 471. The audio tone generator 471 can be enabled to provide audio feedback to the operator when he depresses keys of keyboard 225 in FIG. 2, or to provide other audible alerting functions. The display register 403, 404 is loaded with two binary-coded-decimal (BCD) digits for application to the display. If it is desired to prevent the application of erroneous signals to the LED's and display at power turn-on, registers 401, 402 and 403, 404 may be sequentially addressed and reset to the binary zero state by transmitting appropriate data signals to the keyboard and display interface adapter or separate circuitry may be included to generate a power-on reset signal.

Once the display register 403, 404 has been loaded with two new BCD digits for the display, flip-flops 405 and 406 enable the two new digits in display register 403, 404 to be stored in memories 430 and 431. The strobe signal 334 which loads the two new digits into display latch 403 and 404 also clocks flip-flop 405 causing its output to have a binary zero state. The binary zero output from flip-flop 405 is then clocked into flip-flop 406 in response to the 30 KHz clock signal 408. The output of flip-flop 406 together with the 30 KHz clock signal 408 produces a write pulse at the output of OR gate 407, enables multiplexer 419 to select the address stored in register 354 and also sets flip-flop 405 back to its initial state. The digit from latch 404 is written into memory 430 and the digit from latch 403 is written into memory 431, both being stored at the address from BCD digit address register 354.

At all other times, BCD digits stored in memories 430 and 431 are continuously read out from addresses provided by the Q1-Q3 outputs of divider 415 applied to the memories via multiplexer 432. The read-out digits are then applied to BCD to seven-segment decoder/driver 436, the low order digit from memory 431 being applied first followed by the high order digit from memory 430. Selection between the low order digit from memory 431 and the high order digit from memory 430 is controlled by the Q0 output from divider 415 coupled to the S/X input, and via inverting gate 437, to the S/Y input of multiplexer 432. Gating circuitry 433 and 434 is utilized to detect BCD digit ten and display it as a zero since a dialed "zero" is in reality ten pulses from a conventional telephone instrument. Gating circuitry 435 is utilized to blank the display for BCD digit zero and when switching from digit to digit as indicated by the output from NAND gate 413.

The 30 KHz clock signal 408 is also coupled to shift register 409 which together with gating circuitry 410-412 operates as a divide-by-eight shift counter. The Q0 output from divider 409 is coupled via inverting gate 412 to divider 415. Divider 415 is coupled to flip-flop 417 via inverting gate 416 and operates as a programmable divide-by-sixteen or divide-by-ten counter depending on whether the ten digit mode has been programmably selected. The ten digit mode is selected by the binary one state of the Q0 output from control latch 401, which is coupled to enable NAND gate 418. NAND gate 418 resets divider 415 at a count of ten when enabled. The outputs from divider 415 are used to provide the read address to memories 430 and 431 via multiplexer 419 and to provide via inverting gates 457 the control lines to BCD decoder/drivers 208 and 209 in FIG. 2.

Figure 3D:
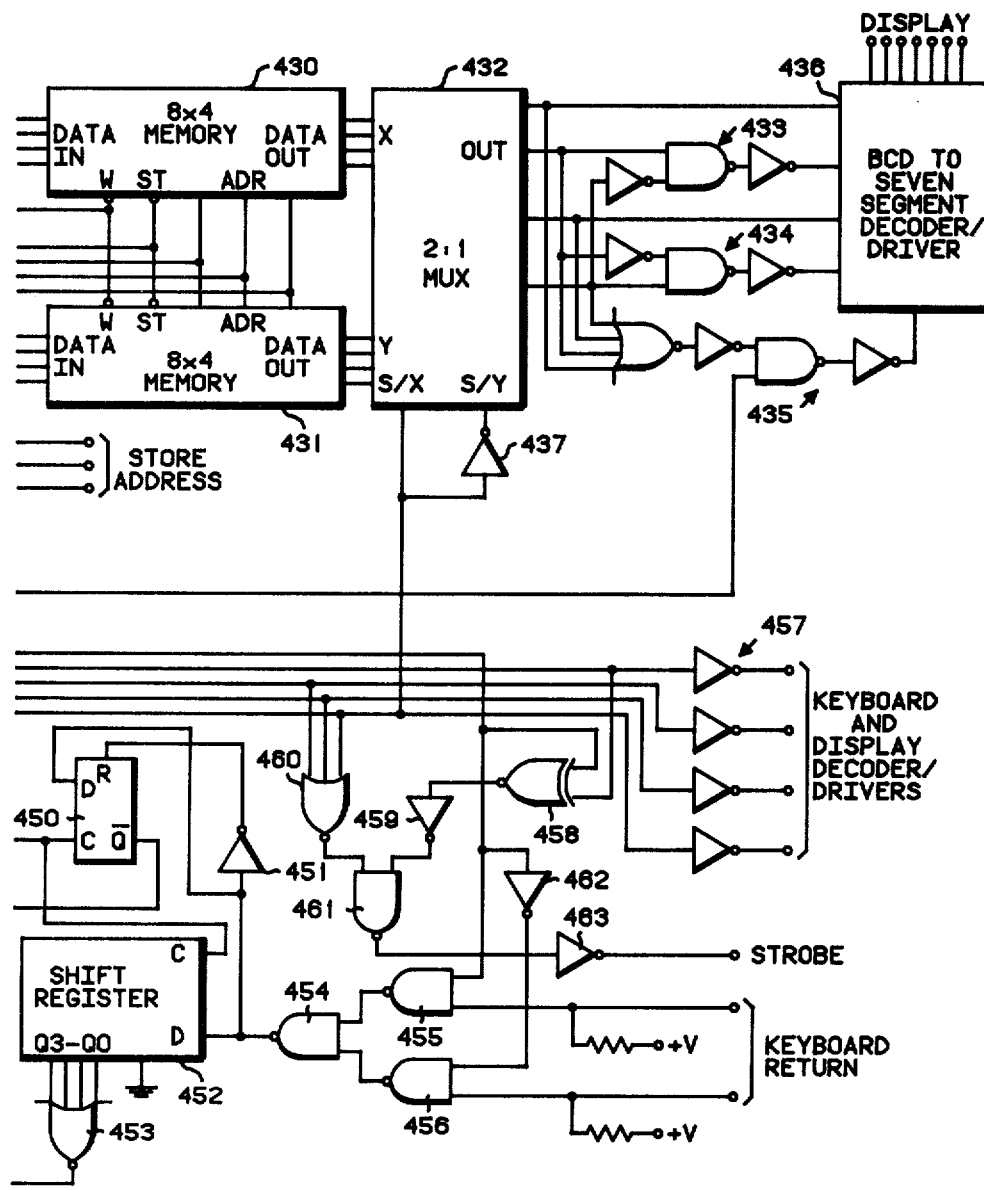

BCD decoder/driver 209 sequentially enables the rows of keys in keyboard 225 in FIG. 2. If a key in the enabled row is activated, gates 454, 456 in FIG. 3D provide an output that changes from a binary one state to a binary zero state, which via inverting gate 451 resets flip-flop 450. The resetting of flip-flop 450 causes a binary zero to one transition at its output clocking register 420. When register 420 is clocked, it is loaded with the outputs from divider 415 and flip-flop 417. Flip-flop 417 is utilized to select between the two columns of keys in the keyboard 425 in FIG. 2. As a result of detection of an activated key, register 420 is clocked and loaded with the states of divider 415 and flip-flop 417 identifying the row and column, respectively, of the activated key. Exclusive OR gates 421 and 424, 425 enable gate 426 to provide a clock pulse to flip-flop 450 and shift register 452 during the next scan of the activated key. If a key remains activated for four consecutive scans, shift register 452 is loaded with four binary zeroes such that NOR gate 453 changes state from a binary zero to a binary one, clocking the status bit in flip-flop 423 to a binary high state. When the status bit 423 is set to a binary one state, it indicates that an activated key has been detected and debounced by shift register 452. When the keyboard and display interface adapter is polled by a data signal from microprocessor 101 in FIG. 1, the return data signal transmitted from transmitting register 364 and applied to the return data signal line by transmission gate 365 contains the status bit together with the address of the row and column of the activated key which has been detected. After a return data signal containing a status bit set to a binary one state has been transmitted, the status bit in flip-flop 423 is reset via NAND gate 338 and inverting gate 339. The return data signal transmitted to the microprocessor 101 also contains a bit indicating whether the off-hook switch 220 in FIG. 2 has been activated. The function of the various bits of the return data signal are summarized in Table III hereinbelow.

TABLE III

EIGHT-BIT RETURN DATA SIGNAL

| Data Bit | Function | Description |
|---|---|---|
| 1 | Column Address | Activated key column |
| 2-5 | Row Address | Activated key row |
| 6 | Off-Hook switch | 0=On Hook<br>1=Off Hook |
| 7 | Debounce Bit | 0=Debounce not detected<br>1=Debounce detected |
| 8 | Status Bit | 0=Key not activated<br>1=Key activated |

Referring to FIG. 4, these are illustrated waveforms for selected circuit elements in FIG. 3 for a sixteen-bit data signal having a 01000010 address and control portion and a 01010011 data portion. The address and control portion 01000010 indicates that the display register 403, 404 is to be loaded with the data portion 01010011, and the two BCD digits, 0101, and 0011, of the data portion are to be stored at address 010 in memories 431 and 430. Thus, BCD digit five 0101 is stored in memory 431 at address 010, and BCD digit three 0011 is stored in memory 430 at address 010. When applied to display 235 in FIG. 2, five appears in the third from the right display element and three appears in the fourth from the right display element. While the data portion is being shifted into receiving register 350, transmitting register 364 is loaded with 10110011 indicating the SND key in column 2 row 7 is debounced and activated and the off-hook switch is on-hook, and serially shifted and coupled via transmission gate 365 to the return data signal line.

Referring to FIG. 5, there is illustrated different circuitry for storing the digits to be applied to display 235 in FIG. 2. Instead of the display register 403, 404 and memories 430 and 431 in FIG. 3D, eight display registers 501-508 interconnected by AND gates 521-527 are serially loaded in succession with the seven segment bits for each digit to be displayed. The outputs from display registers 501-508 may then be applied directly to a conventional static or multiplexed display.

The NRZ data from exclusive OR gate 310 is serially shifted into display register 501 in response to a clock signal from NAND gate 512 which combines clock signal 311 and enable signal from gate 519. AND gate 519 combines the write enable signal from exclusive OR gate 319, the chip select signal from flip-flop 324, the Q signal from flip-flop 323, and the $\overline{Q}$ signal from flip-flop 313 to provide an enable signal gating seven clock pulses from gate 512 to registers 501-508. Display registers 502-508 are interconnected by AND gates 521-527, which are enabled by the output of flip-flop 511, causing digits to be loaded into display 235 in FIG. 2 from right to left.

The seven segment information (bits 10-16 in Table II) for each digit together with a reset bit (bit 9) are included in the data portion of each data signal selecting the display registers 501-508 (bit 4=0). The reset bit is loaded into flip-flop 511 in response to the enable signal from gate 519 and causes digits two through eight of the display to be blanked when the reset bit has a binary one state. Only display register 501, corresponding to the first digit of the display, can be loaded when the reset bit has a binary one state. This feature of the present invention causes the display to be blanked, while at the same time allowing one digit to be loaded into the first display element if desired.

The keyboard and display interface adapter in FIGS. 3A-3D and FIG. 5 can be constructed of standard integrated circuit devices, such as the CMOS devices described in the CMOS Integrated Circuits Book, published by Motorola Semiconductor Products, Inc., Austin, Tex., 1978. Furthermore, the electrical circuit devices comprising the keyboard and display interface adapter in FIGS. 3A-3D can be readily integrated into a semiconductive substrate and provided in a single integrated circuit device.

In summary, a unique keyboard and display interface adapter has been described which can accommodate up to sixteen digits of a display and thirty-two keys of a keyboard. The interface adapter is selectively addressed by data signals received from a unique self-clocking serial data bus. The self-clocking serial data bus includes true data and complement data signal lines for transmitting data signals to the interface adapter and a return data signal line for receiving data signals from the interface adapter. The data transmission on the self-clocking serial data bus is highly immune to both speed and timing variations. As a result, the keyboard and display interface adapter can be mechanized without utilizing expensive and complex timing circuitry. Moreover, the keyboard and display interface adapter can be physically separated from a control unit by substantial distances, only requiring three wires for the serial data bus interconnecting them. The inventive interface adapter may be advantageously utilized in any application where it is required to minimize the number of interconnections between a control unit and a keyboard and display while providing reliable bidirectional data communications therebetween.

What is claimed is:

1. Interface adapter circuitry coupled to a plurality of input signals to a display having a plurality of display elements and further coupled to a self-clocking serial data bus having binary first and second forward data signal lines for receiving a binary data signal including data, address and control portions, transmitted from a signal source, the first and second forward data signals transmitted respectively on the first and second forward data signal lines having a first binary state before and after the data signal, the first forward data signal having a second binary state and the second forward data signal having the first binary state for data signal bits having a binary one state, the first forward data signal having the first binary state and the second forward data signal having the second binary state for data signal bits having a binary zero state, and the first and second forward data signals having the second binary state between successive data signal bits, said interface adapter circuitry comprising:

generating means coupled to the first and second forward data signal lines and being responsive to either the second binary state of the first forward data signal and first binary state of the second forward data signal, or responsive to the first binary state of the first forward data signal and the second binary state of the second forward data signal, for generating a clock signal;

latch means for storing and providing an output signal and being coupled to the first and second forward data signal lines for storing and providing a binary one state of the output signal in response to the second binary state of the first forward data signal and the first binary state of the second forward data signal, and storing and providing a binary zero state of the output signal in response to the first binary state of the first forward data signal and the second binary state of the second forward data signal;

receiving register means coupled to the latch means and the clock signal generating means and being responsive to the clock signal for serially receiving the latch means output signal, said received output signals being the binary data signal;

decoding means coupled to the receiving register means for decoding a predetermined address signal in the address portion of the binary data signal in the receiving register means and generating a chip select signal when the predetermined address signal is decoded; and control means coupled to the decoding means and the receiving register means and being responsive to the chip select signal and the control signal portion of the binary data signal in the receiving register means for generating at least a first or a second control signal;

control register means coupled to the receiving register means and control means and being responsive to the first control signal for receiving the data portion of the binary data signal in the receiving register means, said received data portion including output signals for selecting a predetermined sequence of display elements;

display register means coupled to the receiving register means and control means and being responsive to the second control signal for receiving the data portion of the data signal in the receiving register means, said received data portion including output signals for the display; and means coupled to the control register means and display register means for applying the display register output signals to the display elements in response to a predetermined one of the control register output signals.

2. The interface adapter circuitry according to claim 1 wherein said applying means includes means for sequentially applying the display register output signals to the display elements.

3. The interface adapter circuitry according to claim 1, wherein said display register means includes a plurality of registers each providing a plurality of output signals for a corresponding display element, a first register coupled to the latch means for serially receiving the data portion of the data signal from the latch means, and the other registers serially coupled to one another for sequentially receiving the first register output signals, and said applying means coupled to the registers for applying the output signals of each register to a corresponding display element.

4. The interface adapter circuitry according to claim 3, further including means coupled to the receiving register means and said other registers for resetting said other registers to a predetermined state in response to a predetermined one of the signals in the data portion of the data signal in the receiving register means.

5. The interface adapter circuitry according to claim 1, wherein said applying means further includes:
 memory means providing a plurality of output signals and being coupled to the display register means for storing the display register means output signals; and
 means coupled to the memory means for reading out the memory means output signals and applying the read out output signals to the display elements.

6. The interface adapter circuitry according to claim 1, further including status indicating means coupled to the control register means for providing predetermined visual status indications in response to predetermined ones of the control register output signals.

7. The interface adapter circuitry according to claim 1, wherein said serial data bus further includes a return data signal line, and wherein said interface adapter circuitry further includes keyboard means having a plurality of keys arranged in a predetermined number of rows and columns, means coupled to the keyboard means for scanning the rows and columns for activated keys and providing an output signal indicative of a row and column containing an activated key, and transmitting means coupled to the scanning means, decoding means and clock signal generating means and being enabled by the chip select signal to apply the scanning means output signal to the return data signal line in response to the clock signal.

8. The interface adapter circuitry according to claim 7, wherein said transmitting means further includes transmitting register means for storing the scanning means output signal, said transmitting register means responsive to the clock signal for storing the scanning means output signal when the chip select signal is absent and shifting out the stored scanning means output signal line for application to the return data signal when the chip select signal is present.

9. The interface adapter circuitry according to claim 1, wherein said address decoding means is further coupled to a plurality of address signal lines from a second signal source, said second signal source providing the predetermined address signal.

10. The interface adapter circuitry according to claim 1, wherein said interface adapter circuitry further includes means coupled to the latch means and control means and being responsive to a third control signal for logically complementing the latch means output signal received by the receiving register means, said control means being responsive to the control portion of the data signal in the receiving register means for providing the third control signal.

11. The interface adapter circuitry according to claims 1, wherein said control means includes means for disabling said first and second control signals in response to detection of the first binary state of the first and second forward data signals.

12. The interface adapter circuitry according to claims 1 or 7, further including substrate means, said interface adapter circuitry formed of electrical circuit components integrated into the substrate means.

13. The interface adapter circuitry according to claim 10, wherein said complementing means includes means responsive to the third control signal for logically complementing the first and second control signals.

* * * * *

UNITED STATES PATENT AND TRADEMARK OFFICE
CERTIFICATE OF CORRECTION

PATENT NO. : 4,398,265
DATED : August 9, 1983
INVENTOR(S) : Larry C. Puhl and Lawrence E. Connell It is certified that error appears in the above—identified patent and that said Letters Patent is hereby corrected as shown below:

Claim 8, Column 14 - Line 40  Delete "line" and insert --line-- after "data signal"

Signed and Sealed this

Eighteenth Day of October 1983

[SEAL]

Attest:

GERALD J. MOSSINGHOFF

Attesting Officer      Commissioner of Patents and Trademarks